United States Patent
Shen et al.

(10) Patent No.: US 9,030,999 B2
(45) Date of Patent: May 12, 2015

(54) METHOD AND DEVICE FOR TRANSMITTING PILOT CONFIGURATION INFORMATION

(75) Inventors: Zukang Shen, Beijing (CN); Libo Wang, Beijing (CN); Xueming Pan, Beijing (CN); Wenjian Zhang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 102 days.

(21) Appl. No.: 13/583,470

(22) PCT Filed: Mar. 22, 2011

(86) PCT No.: PCT/CN2011/072025
§ 371 (c)(1),
(2), (4) Date: Sep. 7, 2012

(87) PCT Pub. No.: WO2011/116679
PCT Pub. Date: Sep. 29, 2011

(65) Prior Publication Data
US 2013/0003647 A1 Jan. 3, 2013

(30) Foreign Application Priority Data
Mar. 22, 2010 (CN) .......................... 2010 1 0130985

(51) Int. Cl.
| H04W 4/00 | (2009.01) |
| H04L 5/00 | (2006.01) |
| H04B 7/14 | (2006.01) |

(Continued)

(52) U.S. Cl.
CPC ............ *H04L 5/0091* (2013.01); *H04L 5/0048* (2013.01); *H04B 7/14* (2013.01); *H04B 7/15* (2013.01); *H04W 16/26* (2013.01); *H04W 24/02* (2013.01); *H04W 84/047* (2013.01);

(Continued)

(58) Field of Classification Search
None
See application file for complete search history.

(56) References Cited

U.S. PATENT DOCUMENTS

| 8,599,819 B2 * | 12/2013 | Kim et al. ...................... 370/344 |
| 2010/0104034 A1 * | 4/2010 | Nam et al. ..................... 375/260 |

(Continued)

FOREIGN PATENT DOCUMENTS

| CN | 101588582 | 11/2009 |
| WO | KR2008003436 | * 6/2008 |

(Continued)

OTHER PUBLICATIONS

Author Unknown, Supporting frequency diversity and frequency selective R-PDCCH transmissions, submission to 3GPP TSG-RAN Working Group 1 Meeting 60, Doc. No. R1-101320, Feb. 26, 2010, pp. 1-5.*

(Continued)

*Primary Examiner* — Christopher Crutchfield
(74) *Attorney, Agent, or Firm* — Foley & Lardner LLP

(57) ABSTRACT

A method and device for transmitting pilot configuration information are provided for transmitting the pilot configuration information to relay nodes, and enabling the relay nodes to receive pilots according to the pilot configuration information and implement channel demodulation. Said method includes the following steps: a Node B generates a high-level signaling which includes the pilot configuration information configured for the Relay-Physical Downlink Control Channel (R-PDCCH); the Node B transmits said high-level signaling to a relay device.

8 Claims, 7 Drawing Sheets

(51) Int. Cl.
- *H04B 7/15* (2006.01)
- *H04W 24/02* (2009.01)
- *H04W 16/26* (2009.01)
- *H04W 84/04* (2009.01)
- *H04L 25/02* (2006.01)
- *H04W 72/04* (2009.01)

(52) U.S. Cl.
CPC .............. *H04L 5/005* (2013.01); *H04L 5/0051* (2013.01); *H04L 25/0226* (2013.01); *H04W 72/0453* (2013.01)

(56) References Cited

U.S. PATENT DOCUMENTS

| | | | |
|---|---|---|---|
| 2011/0064159 A1* | 3/2011 | Ko et al. | 375/267 |
| 2011/0111781 A1* | 5/2011 | Chen et al. | 455/507 |

FOREIGN PATENT DOCUMENTS

| | | |
|---|---|---|
| WO | WO-2011/008057 | 1/2011 |
| WO | WO-2011/021852 | 2/2011 |
| WO | WO-2011/049401 | 4/2011 |

OTHER PUBLICATIONS

Author Unknown, Design of reference signals for relay backhaul link in LTE-A, submission to 3GPP TSG-RAN Working Group 1 Meeting 58bis, Doc. No. R1-094152, Oct. 16, 2009, pp. 1-4.*

3GPP TSG RAN WG1 meeting #59bis Valencia, Spain, Huawei, Jan. 18-22, 2010 From: http://www.3gpp.org/ftp/specs/html-info/TDocExMtg--R1-59b--28028.htm.

International Search Report for PCT/CN2011/072025 dated Jul. 7, 2011.

Supplementary European Search Report for EP 11 75 8789, mailed Jun. 11, 2014.

* cited by examiner

METHOD AND DEVICE FOR TRANSMITTING PILOT CONFIGURATION INFORMATION

This application is a US National Stage of International Application No. PCT CN2011/072025, filed 22 Mar. 2011, designating the United States, and claiming priority to Chinese Patent Application No. 201010130985.1, filed with the State Intellectual Property Office of China on Mar. 22, 2010 and entitled "Method and device for transmitting pilot configuration information", all of which are hereby incorporated by reference in their entirety.

FIELD OF THE INVENTION

The present invention relates to the field of communications and particularly to a method and device for transmitting pilot configuration information.

BACKGROUND OF THE INVENTION

Demodulation of a channel is an indispensable step during communication. Typically a channel is demodulated with a received pilot. Before the pilot is received, it is necessary to know port numbers and the number of ports for the pilot so that the pilot is received at a corresponding location. A pilot includes a common pilot (e.g., a Cell Reference Signal (CRS)) and a dedicated pilot (e.g., a Demodulation Reference Signal (DMRS)).

With a pilot being a CRS, the number of ports for the CRS can be obtained by receiving broadcast information. All of relay nodes and User Equipments (UEs) in a cell adopt the same pilot for channel demodulation, and there is a problem that a specific node or equipment cannot be configured separately with a CRS.

With a pilot being a DMRS, since the DMRS can only be used to demodulate a data channel, port numbers and the number of ports thereof cannot be transmitted over a broadcast channel and currently are transmitted in a control information format of a Physical Downlink Control Channel (PDCCH). However, while a base station (e.g., an evolved Node B (eNB)) transmits a PDCCH to a relay node, the relay node also transmits a PDCCH to a user equipment, so the relay node cannot receive the PDCCH transmitted from the base station and further cannot obtain port information from the PDCCH to demodulate a Relay-Physical Downlink Control Channel (R-PDCCH), etc. In summary, a solution for effectively notifying port information of a DMRS to a relay node has been absent so far so that the relay node cannot receive the DMRS and perform subsequent channel demodulation and further the node cannot be configured separately with a CRS.

SUMMARY OF THE INVENTION

Embodiments of the invention provide a method and device for transmitting pilot configuration information in a relay system so as to transmit the pilot configuration information to a Relay Node (RN).

A method for transmitting pilot configuration information in a relay system includes:
   generating, by a base station, high layer signaling carrying pilot configuration information configured for an R-PDCCH; and
   transmitting, by the base station, the high layer signaling to a relay node.

A device for transmitting pilot configuration information in a relay system includes:
   a configuring module configured to generate high layer signaling carrying pilot configuration information configured for an R-PDCCH; and
   an interface module configured to transmit the high layer signaling to a relay node.

In this solution, the base station transmits the pilot configuration information configured for the R-PDCCH to the relay node in the high layer signaling for the purpose of transmitting the pilot configuration information to the Relay Node (RN).

Embodiments of the invention further provide a method and device for receiving a pilot in a relay system so that a relay node receives the pilot according to pilot configuration information and demodulates a channel.

A method for receiving a pilot in a relay system includes:
   receiving, by a relay node, high layer signaling transmitted from a base station and parsing the high layer signaling to obtain pilot configuration information configured for an R-PDCCH; and
   receiving, by the relay node, a pilot according to the pilot configuration information configured for the R-PDCCH.

A device for receiving a pilot in a relay system includes:
   a signaling interface module configured to receive high layer signaling transmitted from a base station and parse the high layer signaling to obtain pilot configuration information configured for an R-PDCCH; and
   a pilot interface module configured to receive a pilot according to the pilot configuration information configured for the R-PDCCH.

In embodiments of the invention, a relay node receives pilot configuration information, configured for an R-PDCCH, transmitted from a base station in high layer signaling, and the relay node can receive a pilot according to the pilot configuration information and perform channel demodulation on the R-PDCCH. The pilot configuration information includes one or more of pilot type information, pilot port number information and information of the number of pilot ports and can further include other pilot-related information. The pilot type information includes common pilot type information or dedicated pilot type information. Thus the embodiments of the invention address both the problem of failing to notify port information of a DMRS to a relay node and the problem of failing to configure the node separately with a CRS.

DETAILED DESCRIPTION OF THE EMBODIMENTS

In embodiments of the invention, a base station transmits pilot configuration information configured for an R-PDCCH to a relay node in high layer signaling so that the relay node can receive a pilot according to the pilot configuration information and perform channel demodulation on the R-PDCCH. The pilot configuration information includes at least one of pilot type information and pilot port information and can further include other pilot-related information. The pilot type information includes common pilot type information or dedicated pilot type information. The pilot port information includes at least one of pilot port number information and information of the number of pilot ports configured for the R-PDCCH. The base station transmits the high layer signaling to the relay node over a broadcast channel or a dedicated channel. For example, the high layer signaling is Radio Resource Control (RRC) signaling, etc. Thus, the embodiments of the invention address both the problem of failing to notify port information of a DMRS to a relay node and the problem of failing to configure the node separately with a CRS.

Figure 1:
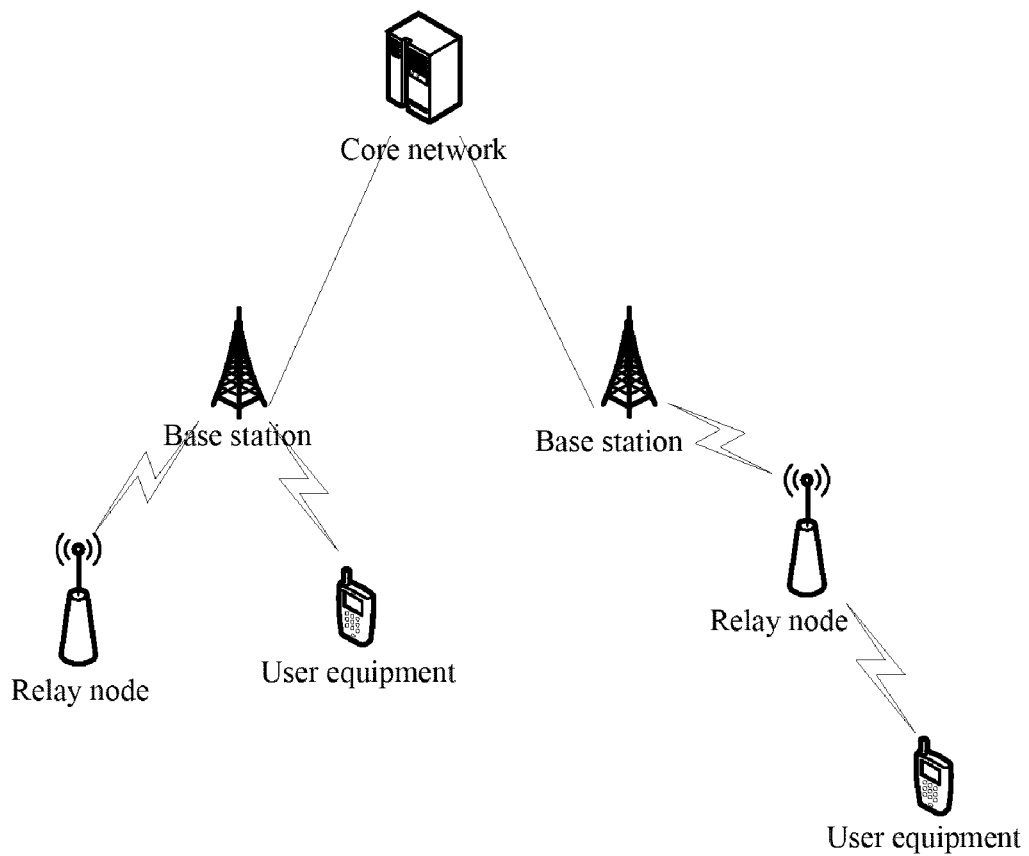
FIG. 1 is a schematic structural diagram of a relay system according to an embodiment of the invention.

Referring to FIG. 1, a relay system in the present embodiment includes a base station and a relay node.

The base station interacts directly with the relay node and a user equipment and can further be connected directly with a Core Network (CN). The base station is configured to generate high layer signaling carrying pilot type information configured for an R-PDCCH and pilot port number information and/or information of the number of pilot ports configured for the R-PDCCH and transmit the high layer signaling to the relay node.

The relay node is configured to forward a message between the user equipment and the base station, receive the high layer signaling transmitted from the base station, parse the high layer signaling to obtain the pilot type information configured for the R-PDCCH and the pilot port number information and/or the information of the number of pilot ports configured for the R-PDCCH, and receive a pilot according to the pilot type information configured for the R-PDCCH and the pilot port number information and/or the information of the number of pilot ports configured for the R-PDCCH.

The pilot type information is embodied in a variety of forms, for example, in the form of a type identifier, where different type identifiers represent a common pilot and a dedicated pilot. Alternatively, a type identifier represents a dedicated pilot, and when the high layer signaling carries the type identifier, it indicates pilot configuration information of a dedicated pilot, and if the type identifier is not carried, it indicates pilot configuration information of a common pilot. Other forms are also possible and will not be enumerated here.

The high layer signaling can carry pilot port number information and/or information of the number of pilot ports. For example, the high layer signaling can carry only pilot port number information, and the base station carries all of port numbers configured for the R-PDCCH in the high layer signaling, and this scheme can configure the R-PDCCH with inconsecutive port numbers. The high layer signaling can carry only the information of the number of pilot ports which can be a specific numeral, encoded numeral, etc., and in this scheme, a starting pilot port number shall be notified in advance to the relay node, and can be notified in a high layer signaling or configured by an operation and maintenance entity, etc., for the relay node, and then the base station notifies the information of the number of pilot ports to the relay node in the high layer signaling, and the relay node determines pilot port numbers according to the starting pilot port number and the information of the number of pilot ports, for example, the starting pilot port number is 7 and the information of the number of pilot ports is 2, and then pilot port numbers configured for the R-PDCCH are 7 and 8. This scheme is primarily applicable to configuring consecutive pilot port numbers and can save a signaling length as compared with the scheme in which only pilot port number information is carried. When the high layer signaling carries pilot port number information and information of the number of pilot ports, the pilot port number information can be a starting pilot port number, and the relay node determines pilot port numbers according to the starting pilot port number and the information of the number of pilot ports, and this scheme may not configure fixedly any starting pilot port number but can specify different starting pilot port numbers upon each configuration as compared with the scheme in which only the information of the number of pilot ports is carried. And with a larger number of configured pilot port numbers, a signaling resource can be saved as compared with the scheme in which only pilot port number information is carried. If a correspondence relationship between starting pilot port numbers and pilot type information is preconfigured, for example, a starting pilot port number of a common pilot is 0 and a starting pilot port number of a dedicated pilot is 7, the pilot type information can be omitted in the high layer signaling and represented implicitly by the pilot port number information. If the information of the number of pilot ports is configured fixedly and a correspondence relationship between starting pilot port numbers and pilot type information is preconfigured, the pilot port number information and the information of the number of pilot ports can also be represented implicitly even if the pilot type information is notified in the high layer signaling. In summary, the high layer signaling can carry only pilot type information, or carry only information of the number of pilot ports, or carry pilot type information and information of the number of pilot ports, or carry pilot port number information and information of the number of pilot ports, or carry pilot type information, pilot port number information and information of the number of pilot ports.

Figure 2:
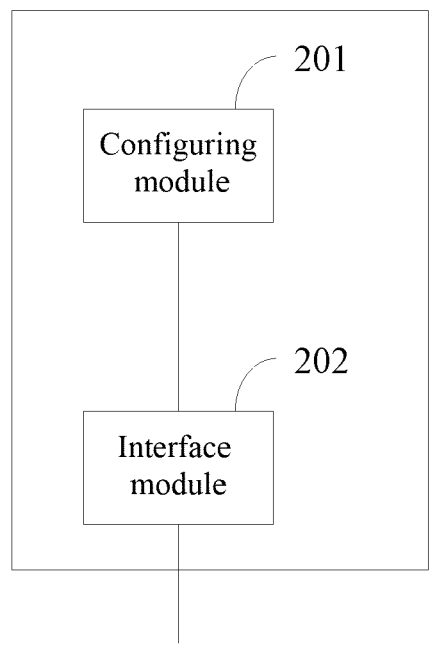
FIG. 2 is a schematic structural diagram of a device for transmitting pilot configuration information in a relay system according to an embodiment of the invention.

Referring to FIG. 2, a device for transmitting pilot configuration information in a relay system according to the present embodiment includes a configuring module 201 and an interface module 202. Particularly the base station can be an evolved Node B (eNB) in a Long Term Evolution (LTE) system, etc. Particularly the device can be a base station.

The configuring module 201 is configured to generate high layer signaling carrying pilot type information configured for an R-PDCCH and pilot port number information and/or information of the number of pilot ports configured for the R-PDCCH. The pilot type information includes common pilot type information or dedicated pilot type information.

The interface module 202 is configured to transmit the high layer signaling to a relay node. The interface module 202 is further configured to transmit a pilot configured for the R-PDCCH over the R-PDCCH according to the pilot type information configured for the R-PDCCH and the pilot port number information and/or the information of the number of pilot ports configured for the R-PDCCH.

R-PDCCHs can be configured in a plurality of Physical Resource Blocks (PRBs). When the configuring module 201 is required to configure R-PDCCHs in a plurality of physical resource blocks with a pilot, the high layer signaling can further include indicator information of the physical resource blocks. In the high layer signaling, the indicator information of the physical resource blocks corresponds to the same or different pilot port number information; and/or the indicator information of the physical resource blocks corresponds to the same or different information of the number of pilot ports. If the R-PDCCHs in a plurality of physical resource blocks are configured with the same pilot, that is, each R-PDCCH corresponds to substantially the same pilot port number, the indicator information of the physical resource blocks can be omitted in the high layer signaling.

The interface module 202 is further configured to transmit pilot port number information and/or information of the number of pilot ports configured for a Relay-Physical Downlink Shared Channel (R-PDSCH) over the R-PDCCH. For a form in which the pilot port number information and/or the information of the number of pilot ports configured for the R-PDSCH is embodied, reference can be made to the pilot port number information and/or the information of the number of pilot ports configured for the R-PDCCH. The configuring module 201 can configure the same or different pilot port number information for the R-PDCCH and the R-PDSCH; and/or the configuring module can configure the same or different information of the number of pilot ports for the R-PDCCH and the R-PDSCH. The interface module 202 is further configured to transmit a pilot configured for the R-PDSCH over the R-PDSCH according to pilot type information configured for the R-PDSCH and the pilot port number information and/or the information of the number of pilot ports configured for the R-PDSCH.

Figure 3:
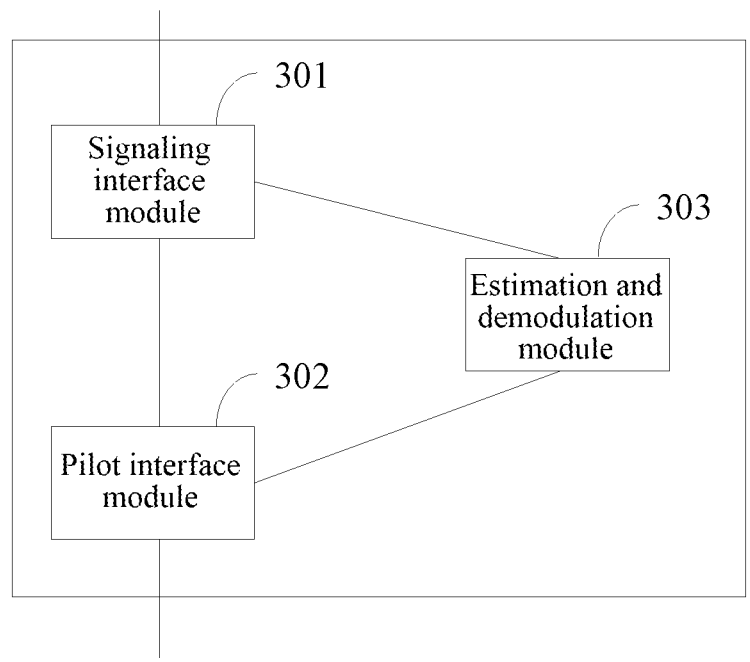
FIG. 3 is a schematic structural diagram of a device for receiving a pilot in a relay system according to an embodiment of the invention.

Referring to FIG. 3, a device for receiving a pilot in a relay system according to the present embodiment includes a signaling interface module 301 and a pilot interface module 302. Particularly the device can be a relay node.

The signaling interface module 301 is configured to receive high layer signaling transmitted from a base station and parse the high layer signaling to obtain pilot type information configured for an R-PDCCH and pilot port number information and/or information of the number of pilot ports configured for the R-PDCCH.

The pilot interface module 302 is configured to receive a pilot according to the pilot type information configured for the R-PDCCH and the pilot port number information and/or the information of the number of pilot ports configured for the R-PDCCH.

The relay node further includes an estimation and demodulation module 303 configured to perform channel estimation and demodulation on the R-PDCCH according to the received pilot upon reception of the pilot.

The estimation and demodulation module 303 is further configured to obtain pilot port number information and/or information of the number of pilot ports configured for an R-PDSCH after demodulating the R-PDCCH. The pilot interface module 302 is further configured to receive a pilot according to the pilot port number information and/or the information of the number of pilot ports configured for the R-PDSCH. The estimation and demodulation module 303 is further configured to perform channel estimation and demodulation on the R-PDSCH according to the received pilot. Since R-PDSCHs can be configured in a plurality of physical resource blocks, indicator information of the physical resource blocks can also be transmitted over the R-PDCCH, and the indicator information of the plurality of physical resource blocks can correspond to different pilot configuration information configured for the R-PDSCHs.

When the high layer signaling includes indicator information of physical resource blocks and the indicator information of the plurality of physical resource blocks corresponds to different pilot configuration information, the estimation and demodulation module 303 performs channel estimation and demodulation on R-PDCCHs in the plurality of physical resource blocks respectively. When the indicator information of the plurality of physical resource blocks corresponds to the same pilot port, the estimation and demodulation module 303 can perform channel estimation and demodulation on R-PDCCHs in the plurality of physical resource blocks concurrently according to the received pilot.

The internal structures and functions of the base station and the relay node have been described above, and transmission process of pilot configuration information performed by the base station and the relay node will be introduced below.

Figure 4:
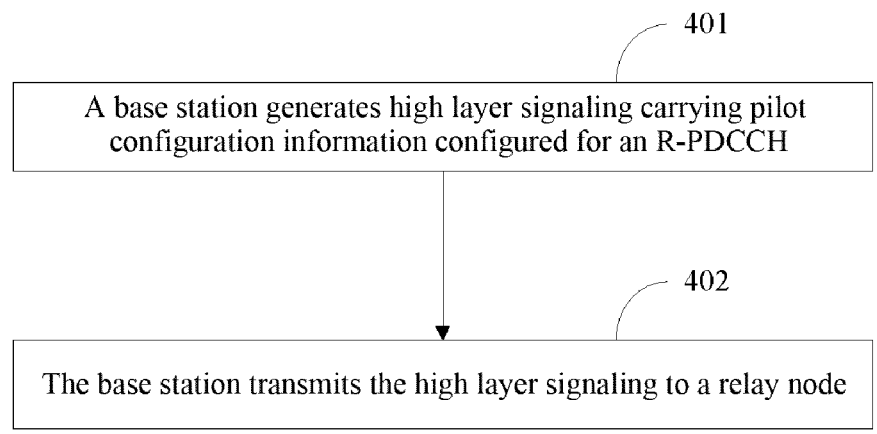
FIG. 4 is a schematic flow chart of a method for transmitting pilot configuration information at the base station side according to an embodiment of the invention.

Referring to FIG. 4, a flow of a method for transmitting pilot configuration information at the base station side according to the embodiment of the invention is as follows.

Step 401: A base station generates high layer signaling carrying pilot configuration information configured for an R-PDCCH.

Step 402: The base station transmits the high layer signaling to a relay node.

Figure 5:
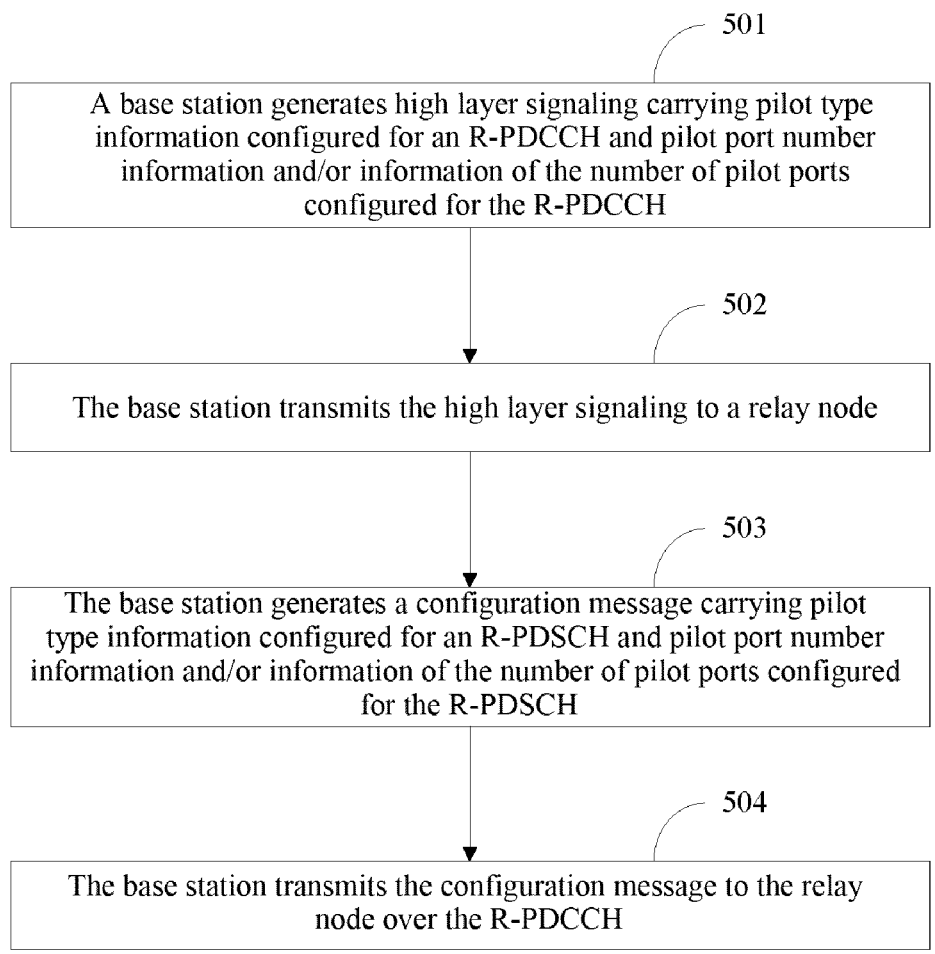
FIG. 5 is a schematic flow chart of a particular method for transmitting pilot configuration information at the base station side according to an embodiment of the invention.

Referring to FIG. 5, a flow of a particular method for transmitting pilot configuration information at the base station side according to the embodiment of the invention is as follows.

Step 501: A base station generates high layer signaling carrying pilot type information configured for an R-PDCCH and pilot port number information and/or information of the number of pilot ports configured for the R-PDCCH.

Step 502: The base station transmits the high layer signaling to a relay node. The base station can further transmit a pilot configured for the R-PDCCH according to the pilot type information configured for the R-PDCCH and the pilot port number information and/or the information of the number of pilot ports configured for the R-PDCCH.

Step 503: The base station generates a configuration message carrying pilot type information configured for an R-PDSCH and pilot port number information and/or information of the number of pilot ports configured for the R-PDSCH.

Step 504: The base station transmits the configuration message to the relay node over the R-PDCCH. The base station can further transmit a pilot configured for the R-PDSCH according to the pilot type information configured for the R-PDSCH and the pilot port number information and/or the information of the number of pilot ports configured for the R-PDSCH.

The steps 501 and 502 and the steps 503 and 504 are two relatively independent processes and can be performed in a reverse order.

Figure 6:
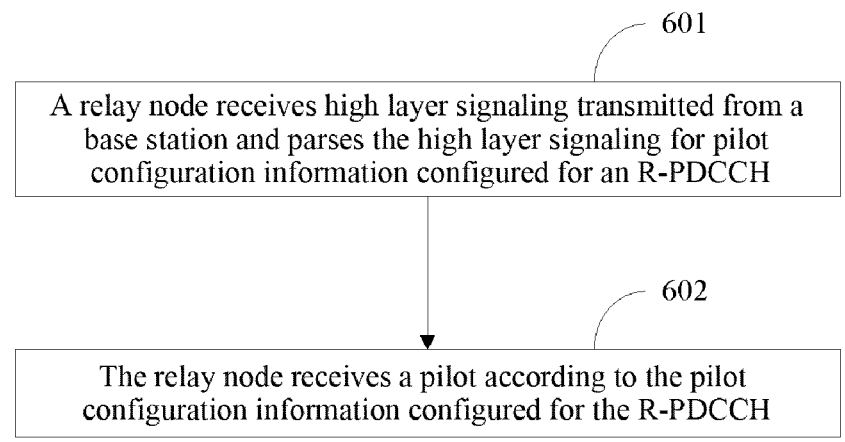
FIG. 6 is a schematic flow chart of a method for transmitting pilot configuration information at the relay node side according to an embodiment of the invention.

Referring to FIG. 6, a flow of a method for transmitting pilot configuration information at the relay node side according to the present embodiment of the invention is as follows.

Step 601: A relay node receives high layer signaling transmitted from a base station and parses the high layer signaling to obtain pilot configuration information configured for an R-PDCCH.

Step 602: The relay node receives a pilot according to the pilot configuration information configured for the R-PDCCH.

Figure 7:
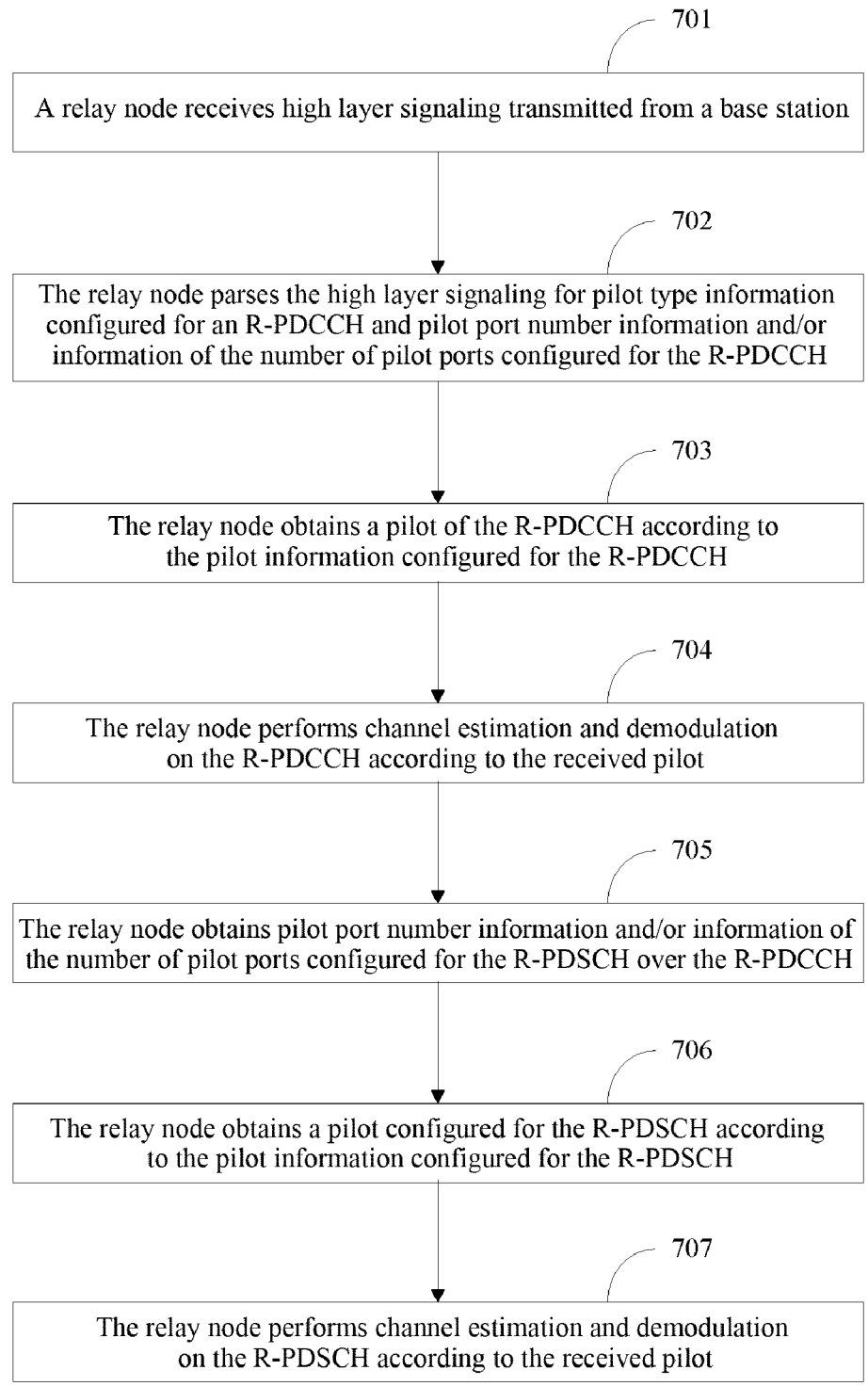
FIG. 7 is a schematic flow chart of a particular method for transmitting pilot configuration information at the relay node side according to an embodiment of the invention.

Referring to FIG. 7, a flow of a particular method for transmitting pilot configuration information at the relay node side according to the present embodiment of the invention is as follows.

Step 701: A relay node receives high layer signaling transmitted from a base station.

Step 702: The relay node parses the high layer signaling for pilot type information configured for an R-PDCCH and pilot port number information and/or information of the number of pilot ports configured for the R-PDCCH.

Step 703: The relay node obtains a pilot of the R-PDCCH according to the pilot configuration information configured for the R-PDCCH.

Step 704: The relay node performs channel estimation and demodulation on the R-PDCCH according to the received pilot. A configuration message including pilot type information configured for an R-PDSCH and pilot port number information and/or information of the number of pilot ports configured for the R-PDCCH is obtained over the R-PDCCH. When the high layer signaling includes indicator information of physical resource blocks and the indicator information of the plurality of physical resource blocks corresponds to different pilot ports, the relay node performs channel estimation and demodulation on R-PDCCHs in the plurality of physical resource blocks respectively.

Step 705: The relay node obtains pilot port number information and/or information of the number of pilot ports configured for the R-PDSCH over the R-PDCCH.

Step 706: The relay node obtains a pilot configured for the R-PDSCH according to the pilot configuration information configured for the R-PDSCH.

Step 707: The relay node performs channel estimation and demodulation on the R-PDSCH according to the received pilot. When the configuration message includes indicator information of physical resource blocks and the indicator information of the plurality of physical resource blocks corresponds to different pilot ports, the relay node performs channel estimation and demodulation on R-PDSCHs in the plurality of physical resource blocks respectively.

Software in which the embodiments of the invention are embodied can be stored in a storage medium, e.g., a floppy disk, a hard disk, an optical disk, a flash memory, etc.

In embodiments of the invention, a base station transmits pilot configuration information configured for an R-PDCCH to a relay node in high layer signaling so that the relay node can receive a pilot according to the pilot configuration information and perform channel demodulation on the R-PDCCH. The pilot configuration information includes one or more of pilot type information, pilot port number information and information of the number of pilot ports and can further include other pilot-related information. The pilot type information includes common pilot type information or dedicated pilot type information. Thus, the embodiments of the invention address both the problem of failing to notify port information of a DMRS to a relay node and the problem of failing to configure the node separately with a CRS.

The embodiments of the invention provide a variety of schemes in which pilot type information, pilot port number information and information of the number of pilot ports are carried so as to accommodate needs of a variety of network environments. The embodiments of the invention can also configure R-PDCCHs and R-PDSCHs in a plurality of PRBs with different pilot configuration information and can configure an R-PDCCH and an R-PDSCH with different pilot configuration information to thereby perform flexible configuration of a pilot and thus can be applicable to a time division multiplexing system and a frequency division multiplexing system.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A method for transmitting pilot configuration information in a relay system, comprising:
generating, by a base station, high layer signaling carrying pilot configuration information configured for a Relay-Physical Downlink Control Channel, R-PDCCH, wherein the pilot configuration information comprises at least one of pilot type information and pilot port information, and wherein the pilot type information comprises common pilot type information or dedicated pilot type information, wherein the pilot port information comprises at least one of pilot port number information and information of the number of pilot ports configured for the R-PDCCH, and when the high layer signaling carries pilot port number information and information of the number of pilot ports, the pilot port number information is the starting pilot port number of the pilot ports configured for the R-PDCCH; and
transmitting, by the base station, the high layer signaling to a relay node,
wherein when the base station is required to configure R-PDCCHs in a plurality of physical resource blocks with a pilot, the high layer signaling further carries indicator information of the plurality of physical resource blocks, and wherein in the high layer signaling, the indicator information of the plurality of physical resource blocks corresponds to different pilot configuration information.

2. The method according to claim 1, wherein transmitting by the base station the high layer signaling to the relay node comprises: transmitting, by the base station, the high layer signaling to the relay node over a broadcast channel or a dedicated channel.

3. The method according to claim 1, wherein after the base station transmits the high layer signaling to the relay node, the method further comprises:

transmitting, by the base station, a pilot configured for the R-PDCCH.

4. A method for receiving a pilot in a relay system, comprising:

receiving, by a relay node, high layer signaling transmitted from a base station and parsing the high layer signaling to obtain pilot configuration information configured for a Relay-Physical Downlink Control Channel, R-PDCCH, wherein the pilot configuration information comprises at least one of pilot type information and pilot port information, and wherein the pilot type information comprises common pilot type information or dedicated pilot type information, wherein the pilot port information comprises at least one of pilot port number information and information of the number of pilot ports configured for the R-PDCCH, and when the high layer signaling carries pilot port number information and information of the number of pilot ports, the pilot port number information is the starting pilot port number of the pilot ports configured for the R-PDCCH; and receiving, by the relay node, a pilot according to the pilot configuration information configured for the R-PDCCH, wherein the high layer signaling further carries indicator information of a plurality of physical resource blocks, and wherein in the high layer signaling, the indicator information of the plurality of physical resource blocks corresponds to different pilot configuration information.

5. The method according to claim 4, wherein receiving by the relay node the high layer signaling transmitted from the base station comprises:

receiving, by the relay node, the high layer signaling transmitted from the base station over a broadcast channel or a dedicated channel.

6. The method according to claim 4, further comprising:

performing, by the relay node, channel estimation and demodulation on the R-PDCCH according to the received pilot upon reception of the pilot.

7. A device for receiving a pilot in a relay system, comprising a memory and a processor, wherein the memory stores program code, and wherein the program code is executable by the processor to implement:

a signaling interface module configured to receive high layer signaling transmitted from a base station and parse the high layer signaling to obtain pilot configuration information configured for a Relay-Physical Downlink Control Channel, R-PDCCH, wherein the pilot configuration information comprises at least one of pilot type information and pilot port information, and wherein the pilot type information comprises common pilot type information or dedicated pilot type information, wherein the pilot port information comprises at least one of pilot port number information and information of the number of pilot ports configured for the R-PDCCH; when the high layer signaling carries pilot port number information and information of the number of pilot ports, the pilot port number information is the starting pilot port number of the pilot ports configured for the R-PDCCH; and a pilot interface module configured to receive a pilot according to the pilot configuration information configured for the R-PDCCH, wherein the high layer signaling further comprises indicator information of a plurality of physical resource blocks, and wherein in the high layer signaling, the indicator information of the plurality of physical resource blocks corresponds to different pilot configuration information.

8. The device according to claim 7, wherein the signaling interface module receives the high layer signaling transmitted from the base station over a broadcast channel or a dedicated channel.

* * * * *